US009236632B2

(12) United States Patent
Ohashi et al.

(10) Patent No.: US 9,236,632 B2
(45) Date of Patent: Jan. 12, 2016

(54) ELECTROCHEMICAL DEVICE AND METHOD FOR MANUFACTURING ELECTROCHEMICAL DEVICE

(75) Inventors: Yoshihiko Ohashi, Tokyo (JP); Hidetake Itoh, Tokyo (JP); Kazuo Katai, Tokyo (JP)

(73) Assignee: TDK CORPORATION, Tokyo (JP)

( * ) Notice: Subject to any disclaimer, the term of this patent is extended or adjusted under 35 U.S.C. 154(b) by 295 days.

(21) Appl. No.: 13/578,521

(22) PCT Filed: Feb. 17, 2011

(86) PCT No.: PCT/JP2011/053423
§ 371 (c)(1),
(2), (4) Date: Sep. 6, 2012

(87) PCT Pub. No.: WO2011/105285
PCT Pub. Date: Sep. 1, 2011

(65) Prior Publication Data
US 2013/0004814 A1    Jan. 3, 2013

(30) Foreign Application Priority Data

Feb. 23, 2010  (JP) ............................... P2010-037347
Feb. 23, 2010  (JP) ............................... P2010-037358

(51) Int. Cl.
*H01M 10/0525*    (2010.01)
*H01M 10/0587*    (2010.01)
(Continued)

(52) U.S. Cl.
CPC ........... *H01M 10/0525* (2013.01); *H01G 11/26* (2013.01); *H01G 11/52* (2013.01);
(Continued)

(58) Field of Classification Search
CPC ..................... H01M 10/0587; H01M 10/0525; H01M 4/505; H01M 4/525; H01M 4/5825; H01M 4/485; H01G 11/26; Y10T 29/49117
USPC .......................................... 429/94; 29/623.1
See application file for complete search history.

(56) References Cited

U.S. PATENT DOCUMENTS 6,391,488 B1   5/2002  Shimizu et al.
8,298,702 B2   10/2012 Morimoto et al.
(Continued)

FOREIGN PATENT DOCUMENTS

CN    1280399 A    1/2001
CN    1841834 A    10/2006
(Continued)

OTHER PUBLICATIONS

International Search Report issued in Application No. PCT/JP2011/053423; Dated May 10, 2011.
(Continued)

*Primary Examiner* — Sean P Cullen
(74) *Attorney, Agent, or Firm* — Oliff PLC

(57) ABSTRACT

An electrochemical device includes a wound laminated body with first and second electrodes, first and second separators, an electrolytic solution; and an outer package that houses the wound body and the electrolytic solution. The electrochemical device satisfies, at an outer end of the laminated body in a winding direction: the first and second separators protrude more outward in the winding direction than the second electrode; the first electrode protrudes more outward in the winding direction than the first and second separators; and an outer end of the first separator in the winding direction inclines toward a winding center and comes into contact with an upper surface of the second separator beyond the second electrode and an outer end of the first electrode in the winding direction inclines toward the winding center and comes into contact with the second separator and with the peripherally inner first electrode beyond the second electrode.

3 Claims, 8 Drawing Sheets

(51) Int. Cl.
  *H01G 11/26* (2013.01)
  *H01M 10/04* (2006.01)
  *H01G 13/02* (2006.01)
  *H01G 11/52* (2013.01)
  *H01G 11/86* (2013.01)

(52) U.S. Cl.
  CPC .............. *H01G 11/86* (2013.01); *H01G 13/02* (2013.01); *H01M 10/0409* (2013.01); *H01M 10/0431* (2013.01); *H01M 10/0587* (2013.01); *Y02E 60/122* (2013.01); *Y02E 60/13* (2013.01); *Y10T 29/49117* (2015.01)

(56) References Cited

U.S. PATENT DOCUMENTS

| | | | |
|---|---|---|---|
| 2003/0072993 A1 | 4/2003 | Kim et al. | |
| 2006/0222937 A1* | 10/2006 | Morimoto et al. | 429/164 |
| 2009/0169979 A1 | 7/2009 | Ohashi et al. | |

FOREIGN PATENT DOCUMENTS

| | | |
|---|---|---|
| CN | 1988240 A | 6/2007 |
| JP | A-08-339817 | 12/1996 |
| JP | A-10-064577 | 3/1998 |
| JP | A-11-086877 | 3/1999 |
| JP | A-11-111327 | 4/1999 |
| JP | A-11-273692 | 10/1999 |
| JP | A-2002-216853 | 8/2002 |
| JP | A-2002-343411 | 11/2002 |
| JP | A-2002-343420 | 11/2002 |
| JP | A-2003-123829 | 4/2003 |
| JP | A-2003-197192 | 7/2003 |
| JP | A-2005-116186 | 4/2005 |
| JP | A-2005-293859 | 10/2005 |
| JP | A-2006-260904 | 9/2006 |
| JP | A-2007-123009 | 5/2007 |
| JP | A-2007-134149 | 5/2007 |
| JP | A-2007-194130 | 8/2007 |
| JP | A-2009-163926 | 7/2009 |

OTHER PUBLICATIONS

Translation of International Preliminary Report on Patentability (IPRP) issued in International Application No. PCT/JP2011/053423 on Sep. 18, 2012.

Aug. 6, 2015 Supplementary Partial European Search Report issued in European Application No. 11747249.8.

* cited by examiner

Fig.8
(a)
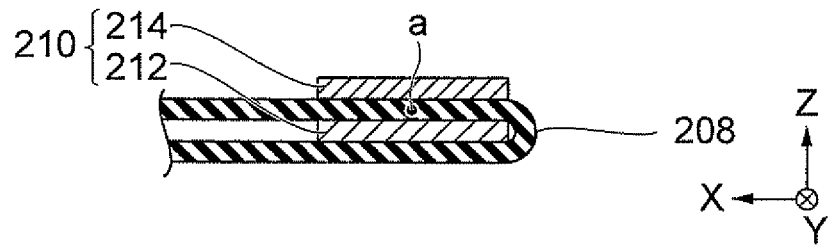
(b)
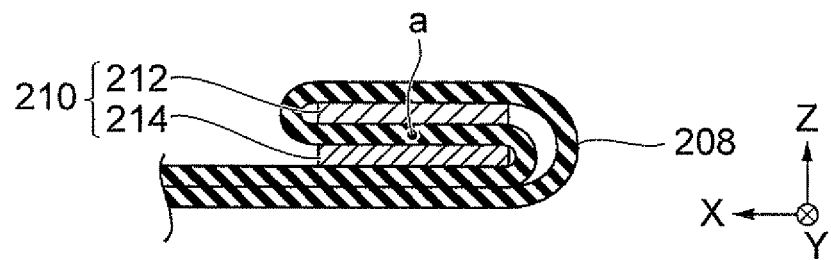
(c)
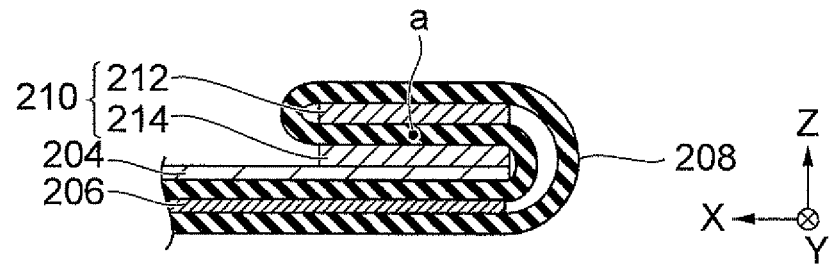
(d)
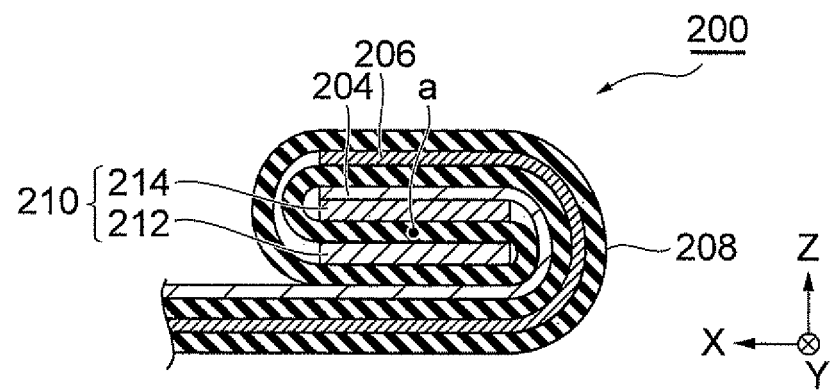

ELECTROCHEMICAL DEVICE AND METHOD FOR MANUFACTURING ELECTROCHEMICAL DEVICE

TECHNICAL FIELD

The present invention relates to an electrochemical device and a method for manufacturing an electrochemical device.

BACKGROUND ART

Conventionally, a wound-type electrochemical device is known in which a laminated body constituted by, starting from the outside, a first electrode, a first separator, a second electrode, and a second separator, is spirally wound toward a center. An outer end of the laminated body in a winding direction is normally fixed by an adhesive tape or the like.

In addition, conventionally, a method for manufacturing a wound-type electrochemical device is known in which an electrode and a separator are wound around cores which oppose each other and which extend in a direction of an axis of rotation.

CITATION LIST

Patent Literature

Patent Literature 1: Japanese Patent Application Laid-open No. H8-339817
Patent Literature 2: Japanese Patent Application Laid-open No. 2002-216853
Patent Literature 3: Japanese Patent Application Laid-open No. 2002-343411
Patent Literature 4: Japanese Patent Application Laid-open No. 2002-343420
Patent Literature 5: Japanese Patent Application Laid-open No. 2003-123829
Patent Literature 6: Japanese Patent Application Laid-open No. 2005-116186
Patent Literature 7: Japanese Patent Application Laid-open No. 2006-260904
Patent Literature 8: Japanese Patent Application Laid-open No. 2007-123009
Patent Literature 9: Japanese Patent Application Laid-open No. 2007-134149
Patent Literature 10: Japanese Patent Application Laid-open No. 2007-194130
Patent Literature 11: Japanese Patent Application Laid-open No. 2009-163926
Patent Literature 12: Japanese Patent Application Laid-open No. H10-64577
Patent Literature 13: Japanese Patent Application Laid-open No. H10-86877

SUMMARY OF THE INVENTION

Technical Problem

First Invention

With such a wound-type electrochemical device, there is a problematic tendency of decreasing capacity and increasing impedance over repeated use.

A first invention has been made in consideration of the problem described above, and an object thereof is to provide an electrochemical device in which degradation of capacity and impedance does not easily occur.

Second Invention

When making a thin wound-type electrochemical device, a thickness of a core thereof must be reduced. Normally, a core having a pair of opposing plates is often used. The present inventors have found that when an electrode and a separator are wound around a core that has a pair of opposing plates and the core is subsequently extracted from the wound body, defective products often occur due to the core becoming lodged against the wound body.

Further study by the present inventors have revealed that when both faces of a plate of the core are sandwiched by separators in a wound body, defective products are particularly likely to occur due to the core becoming lodged against the separators in the wound body.

It was revealed that, for example, when a separator 208 is hooked around only one plate 212 of a core 210 as shown in FIG. 8(*a*), the core 210 is rotated around an axis of rotation a by half a turn as shown in FIG. 8(*b*), one electrode 204 is inserted between another plate 214 and the separator 208 and another electrode 206 is inserted into the separator 208 as shown in FIG. 8(*c*), and the core 210 is wound as shown in FIG. 8(*d*), since the one plate 212 is enclosed by only the separator 208, the plate 212 is likely to become lodged against the separator 208 at this portion.

A second invention has been made in consideration of the problem described above, and an object thereof is to provide a method for manufacturing a wound-type electrochemical device which enables a core to be pulled out easily.

Solution to Problem

First Invention

A study conducted by the present inventors revealed that the deterioration in capacity and impedance when such a wound-type electrochemical device is repeatedly used is partly caused by gas which is generated and accumulated in the electrochemical device over its use.

Specifically, for example, as shown in FIG. 4, when there is a large void V between a peripherally outermost first electrode 6 and a peripherally inner first electrode 6*i* at an outer end 10*e* of a laminated body 10 in a winding direction, it was found that gas generated inside the electrochemical device accumulates in the void V in the form of bubbles and lifts up the first electrode 6 to cause separation of an adhesive tape 33 or create a void or a displacement between the electrodes 4 and 6 and between the separators 8 and 9, causing deterioration in capacity and impedance.

An electrochemical device according to the first invention comprises: a wound body having a wound laminated body having a structure constituted by, starting from the outside, a first electrode, a first separator, a second electrode, and a second separator; an electrolytic solution; and an outer package that houses the wound body and the electrolytic solution. In addition, all of (a) to (c) below are satisfied at an outer end of the laminated body in a winding direction:

(a) the first separator and the second separator protrude more outward in the winding direction than the second electrode;

(b) the first electrode protrudes more outward in the winding direction than the first separator and the second separator; and (c) an outer end of the first separator in the winding direction inclines toward a center of winding beyond the second electrode and comes into contact with an upper surface of the second separator, and an outer end of the first electrode in the winding direction inclines toward the center of winding beyond the second electrode and comes into contact with the second separator and with the peripherally inner first electrode, or the outer end of the first separator in the winding direction inclines toward the center of winding beyond the second electrode and comes into contact with the second separator and with the peripherally inner first electrode, and the outer end of the first electrode in the winding direction inclines toward the center of winding beyond the second electrode and comes into contact with the peripherally inner first electrode.

According to the present invention, since a void created between an end of the peripherally outermost first electrode and the inner periphery first electrode is favorably blocked by the first separator and the second separator, a volume of the void can be reduced. Consequently, defects such as an uplifting of the electrode or a formation of a void between electrodes and separators due to bubbles generated in the void may be suppressed.

In this case, favorably, the former in (c) is true or, in other words, the outer end of the first separator in the winding direction inclines toward the center side beyond the second electrode and comes into contact with the upper surface of the second separator, and the outer end of the first electrode in the winding direction inclines toward the center of winding beyond the second electrode and comes into contact with the second separator and with the peripherally inner first electrode.

Accordingly, since the first electrode comes into contact with both the first separator and the second separator, a displacement between the first electrode and both separators during winding or use is less likely to occur and, in particular, the void can be reduced.

More specifically, particularly in a lithium-ion secondary battery or the like among electrochemical devices, it is known that an electrode expands and contracts during charge and discharge. In such a case, favorably, an electrode and a separator are sufficiently fixed at ends thereof in order to maintain a constant size of a void at a winding end. When fixing must be provided in a relatively minute region as is the case of the present invention, a cut-off end surface of the separator is desirably used as a fixing location to the electrode. This is because a mechanical hardness of the cut-off end surface of the separator tends to increase during cutting and processing, and by bringing the cut-off end surface and an electrode into contact with each other, the electrode and the separator can be strongly fixed to each other.

In addition, in the case of a structure satisfying the former in (c), a cut-off end surface of the first separator and a cut-off end surface of the second separator are both directly pressed against the outermost layer first electrode. Therefore, there is a tendency that the first separator and the second separator can be fixed to the first electrode more strongly. As a result, an expansion of the void decreases even through the expansion and contraction of the electrode during charge and discharge, and an operational advantage of the present invention is achieved in a more adequate manner.

Second Invention

A method for manufacturing an electrochemical device according to the second invention comprises:

a first step of obtaining a state of a core having a pair of plates that oppose each other and that extend in a direction of an axis of rotation, in which a separator is hooked around only one of the plates and in which one electrode is arranged between the hooked separator so that an end of the one electrode is positioned between the one plate and the separator;

a second step of rotating the core around the axis of rotation after the first step so that the one electrode and the separator that sandwiches the one electrode from both sides thereof are hooked around the other plate;

a third step of arranging another electrode along a portion of the separator which is on a side closer to the other plate and which extends in a direction away from the core, and arranging an end of the other electrode between the other plate and the separator after the second step;

a fourth step of further rotating the core around the axis of rotation after the third step to obtain a wound body constituted by the separator, the one electrode, and the other electrode; and an extracting step of extracting the pair of plates from the wound body.

According to the present invention, in the wound body after the fourth step, both plates of the core have one surface opposing an electrode, and neither of the plates has both surfaces sandwiched by the separator. Consequently, since each of the pair of plates can be easily extracted from the wound body in the extraction step, productivity can be increased.

In this case, in the first step, favorably, after the separator is hooked around only one of the plates of the core, the one electrode is arranged between the hooked separator so that an end of the one electrode is positioned between the one plate and the separator.

Consequently, the one electrode can be arranged with ease.

In addition, in the first step, favorably, the end of the one electrode is arranged at a portion that is located between the one plate and the separator and is on a side further from the other plate.

Consequently, the one electrode can be arranged with ease.

Furthermore, in the third step, favorably, the end of the other electrode is arranged at a portion that is located between the other plate and the separator and is on a side further from the one plate.

Consequently, the other electrode can be arranged with ease.

In addition, the separator is favorably a porous resin membrane. A porous resin membrane is readily lodged against a plate when being extracted from the wound body and is therefore particularly effective.

Furthermore, a resin of the separator is favorably polyacrylonitrile. Polyacrylonitrile is particularly effective due to a lack of slipperiness and a higher likelihood of becoming lodged.

Advantageous Effect of the Invention

According to the first invention, an electrochemical device with high retention of capacity and impedance can be provided.

According to the second invention, a method for manufacturing a wound-type electrochemical device that enables easy extraction of a core can be provided.

BRIEF DESCRIPTION OF DRAWINGS

FIGS. 8(a) to 8(d) are schematic cross-sectional views that sequentially explain a reference example of the method for manufacturing an electrochemical device according to the second invention.

DESCRIPTION OF EMBODIMENTS

Figure 1:
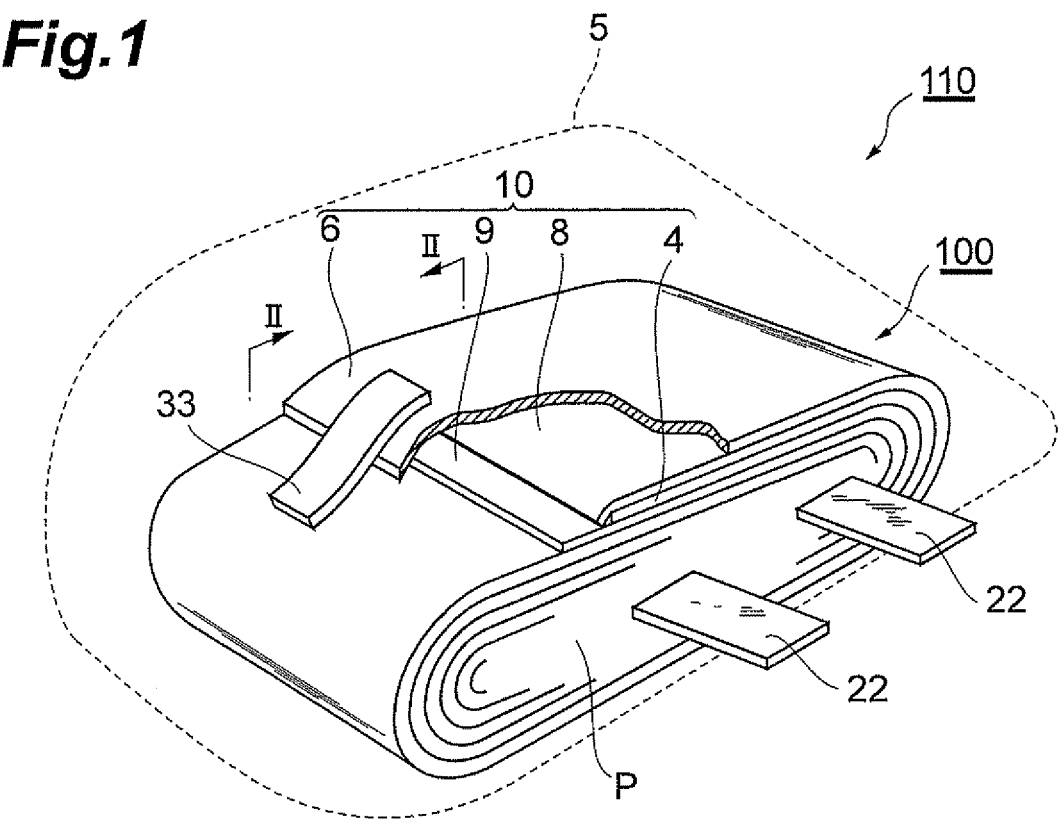
FIG. 1 is a perspective view of an electrochemical device according to a first embodiment of the first invention.

Hereinafter, preferred embodiments of the present invention will be described in detail with reference to the drawings. In the drawings, same or comparable portions are assigned same reference characters and redundant descriptions thereof are omitted. In addition, unless otherwise noted, positional relationships such as up and down, and left and right, are based on positional relationships depicted in the drawings. Furthermore, dimension ratios of the drawings are not limited to the depicted ratios.

First Invention

First Embodiment

First, a wound-type lithium-ion secondary battery 110 as an example of a wound-type electrochemical device according to an embodiment of the first invention will be described with reference to FIGS. 1 and 2. As shown in FIG. 1, the wound-type lithium-ion secondary battery 110 has a wound body 100 having a spirally wound laminated body 10, wherein the laminated body 10 has a structure constituted by, starting from the outside, a positive electrode (a first electrode) 6, a first separator 8, a negative electrode 4 (a second electrode), and a second separator 9. The wound body 100 is sealed inside an outer package 5 together with an electrolytic solution. Leads 22 are respectively connected to the positive electrode 6 and the negative electrode 4 and protrude outside of the outer package 5.

Figure 2:
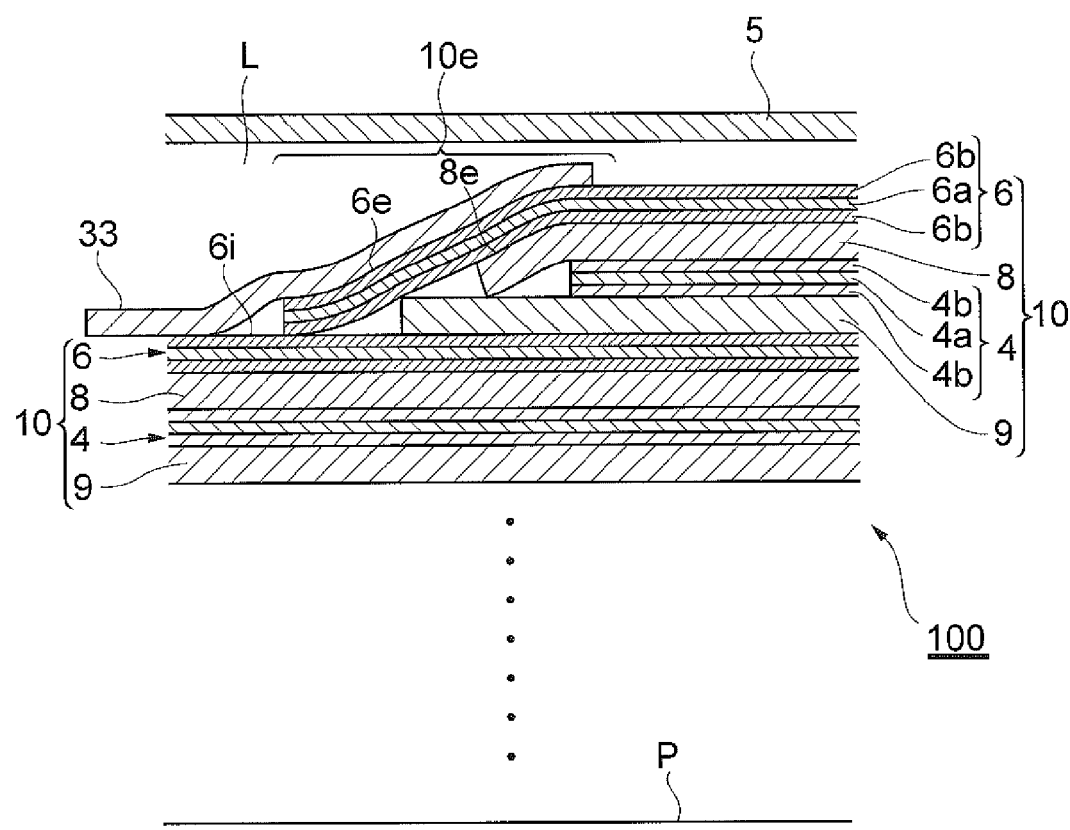
FIG. 2 is a cross sectional view taken along II-II in FIG. 1.

As shown in FIG. 2, the positive electrode 6 has a belt-like positive electrode collector 6a and a positive electrode active material layer 6b that covers both surfaces of the positive electrode collector 6a. The negative electrode 4 has a belt-like negative electrode collector 4a and a negative electrode active material layer 4b that covers both surfaces of the negative electrode collector 4a.

A coverage by the positive electrode active material layer 6b of both surfaces of the positive electrode collector 6a and a coverage by the negative electrode active material layer 4b of both surfaces of the negative electrode collector 4a are not particularly limited. There is a tendency that the higher the respective coverages, the greater the capacity of the lithium-ion secondary battery 110. In the present embodiment, with the exception of portions where the leads 22 respectively connected to the positive electrode 6 and the negative electrode 4 are installed, both surfaces of the positive electrode collector 6a are entirely covered by the positive electrode active material layer 6b and both surfaces of the negative electrode collector 4a are entirely covered by the negative electrode active material layer 4b. In other words, as shown in FIG. 2, with both the positive electrode 6 and the negative electrode 4, there are no exposed parts on both main surfaces of the collectors 6a and 4a at an outer end 10e of the laminated body 10 in a winding direction. A wound body structured in this manner can be readily manufactured by cutting an elongated laminated body. In addition, since a portion positioned at an outermost periphery of an electrode positioned on an peripherally outermost side among the two electrodes does not contribute to electrical and chemical operations, a structure may alternatively be adopted in which a peripherally outermost surface of the electrode is not covered by an active material layer (the positive electrode active material layer 6b or the negative electrode active material layer 4b).

A collector that is used in known electrochemical devices can be used as the positive electrode collector 6a and the negative electrode collector 4a. For example, a collector fomed in a belt shape from copper, aluminum, nickel, or the like can be used.

The positive electrode active material layer 6b is a layer that includes a positive electrode active material (a cathode active material), a conductive additive, a binder, and the like. The cathode active material is not particularly limited as long as the cathode active material is capable of reversibly promoting storage and release of lithium ions, extraction and insertion (intercalation) of lithium ions, or doping and dedoping of lithium ions and counter-anions thereof (for example, $PF_6^-$), and known electrode active materials can be used. For example, complex metallic oxides including lithium cobalt oxide ($LiCoO_2$), lithium nickel oxide ($LiNiO_2$), lithium manganese spinel ($LiMn_2O_4$), a complex metallic oxide described by the general formula $LiNi_xCo_yMn_aM_aO_2$ (where $x+y+z+a=1$, $0 \leq x \leq 1$, $0 \leq y \leq 1$, $0 \leq z \leq 1$, $0 \leq a \leq 1$, and M represents one or more elements selected from the group consisting of Al, Mg, Nb, Ti, Cu, Zn, and Cr), lithium vanadium compound ($LiV_2O_5$), olivine-like $LiMPO_4$ (where M represents one or more elements selected from the group consisting of Co, Ni, Mn or the group consisting of Fe, Mg, Nb, Ti, Al, and Zr, or VO), and lithium titanium oxide ($Li_4Ti_5O_{12}$) can be used.

Examples of materials that can be used as the binder include fluororesins such as polyvinylidene fluoride (PVDF), polytetrafluoroethylene (PTFE), a tetrafluoroethylene-hexafluoropropylene copolymer (FEP), a tetrafluoroethylene-perfluoroalkyl vinyl ether copolymer (PFA), an ethylene-tetrafluoroethylene copolymer (ETFE), polychlorotrifluoroethylene (PCTFE), an ethylene-chlorotrifluoroethylene copolymer (ECTFE), and polyvinyl fluoride (PVF).

In addition, besides the above materials, for example, a vinylidene fluoride-based fluororubber such as vinylidene fluoride-hexafluoropropylene-based fluororubber (VDF-HFP-based fluororubber), vinylidene fluoride-hexafluoropropylene-tetrafluoroethylene-based fluororubber (VDF-HFP-TFE-based fluororubber), vinylidene fluoride-pentafluoropropylene-based fluororubber (VDF-PFP-based fluororubber), vinylidene fluoride-pentafluoropropylene-tetrafluoroethylene-based fluororubber (VDF-PFP-TFE-based fluororubber), vinylidene fluoride-perfluoromethyl vinyl ether-tetrafluoroethylene-based fluororubber (VDF-PFMVE-TFE-based fluororubber), and vinylidene fluoridechlorotrifluoroethylene-based fluororubber (VDF-CTFE-based fluororubber) may be used as the binder.

Furthermore, besides the above materials, for example, polyethylene, polypropylene, polyethylene-telephthalate, aromatic polyamide, cellulose, styrene butadiene rubber, isoprene rubber, butadiene rubber, ethylene propylene rubber, or the like may be used as the binder. In addition, a thermoplastic elastomeric polymer such as a styrene-butadiene-styrene block copolymer, a hydrogen added thereof, a styrene-ethylene-butadiene-styrene copolymer, a styrene-isoprene-styrene block copolymer, and a hydrogen added thereof may be used. Furthermore, syndiotactic 1,2-polybutadiene, an ethylene-vinyl acetate copolymer, a propylene α-olefin (carbon number 2 to 12) copolymer, or the like may be used.

Moreover, an electron-conductive conducting polymer or an ionically-conductive conducting polymer may be used as the binder. Examples of an electron-conductive conducting polymer includes polyacetylene. In this case, since the binder also functions as conductive additive particles, a conductive additive need not be added.

As an ionically-conductive conducting polymer, for example, those having ion conductivity of a lithium-ion or the like can be used, such as a complex of a monomer of a macromolecular compound (a polyether-based macromolecular compound such as polyethylene oxide and polypropylene oxide, a crosslinked polymer of a polyether compound, polyepichlorohydrin, polyphosphazene, polysiloxane, polyvinylpyrrolidone, polyvinylidene carbonate, polyacrylonitrile, and the like), and a lithium salt or an alkali metal salt based on lithium such as $LiClO_4$, $LiBF_4$, $LiPF_6$, $LiAsF_6$, LiCl, LiBr, $Li(CF_3SO_2)_2N$, and $LiN(C_2F_5SO_2)_2$. Examples of a polymerization initiator that can be used for complexification include a photopolymerization initiator or a thermal polymerization initiator suitable for the monomers described above.

A content of the binder favorably ranges from 0.5 to 6 percent by mass in reference to a mass of the active material layer. When the content of the binder drops below 0.5 percent by mass, a tendency of an insufficient amount of the binder preventing a strong active material layer from being formed increases. On the other hand, when the content of the binder exceeds 6 percent by mass, a tendency of an increase in an amount of the binder not contributing to capacitance preventing a sufficient energy density from being obtained increases. Furthermore, in this case, particularly, when an electron conductivity of the binder is low, a tendency of an increase in an electrical resistance of the active material layer preventing a sufficient capacitance from being obtained increases.

Examples of a conductive additive include carbon blacks, carbon material, fine metallic particles of copper, nickel, stainless steel, iron, or the like, a mixture of a carbon material and fine metallic particles, and a conductive oxide such as ITO. A content of the conductive additive favorably ranges from 0.5 to 6 percent by mass in reference to the mass of the active material layer.

The negative electrode active material layer 4b is a layer that includes a negative electrode active material (an anode active material), a conductive additive, a binder, and the like. The anode active material is not particularly limited as long as the anode active material is capable of reversibly promoting storage and release of lithium ions, extraction and insertion (intercalation) of lithium ions, or doping and dedoping of lithium ions and counter-anions thereof (for example, $PF_6^-$), and known anode active materials can be used. Examples of such active materials include carbon materials such as natural graphite, artificial graphite, non-graphitizable carbon, graphitizable carbon, and low-temperature sintered carbon, a metal capable of combining with lithium such as Al, Si, Sn, and Si, an oxide-based amorphous compound such as SiO, $SiO_x$, $SiO_2$, and $SnO_2$, lithium titanium oxide ($Li_4Ti_5O_{12}$), and $TiO_2$. Among the above, a carbon material is favorable, and a carbon material with an interlayer distance $d_{002}$ ranging from 0.335 to 0.338 nm and a crystallite size $Lc_{002}$ ranging from 30 to 120 nm is more favorable. Carbon materials satisfying such a condition include artificial graphite, MCF (meso-carbon fiber), and MCMB (meso-carbon microbeads). The interlayer distance $d_{002}$ and the crystallite size $Lc_{002}$ described above can be obtained by X-ray diffractometry.

The binder and the conductive additive are similar to that of the positive electrode.

As the separators 8 and 9, for example, a separator formed of an electrically insulating porous material can be used. Examples of electrically insulating materials include resin materials such as polyethylene, polypropylene, and other polyolefins, and polyester, polyacrylonitrile (PAN), and other heat resistant resins. These may be single layer bodies or laminated bodies constituted by various resins. A method of manufacturing a porous body of resin is also not particularly limited, and stretching, phase inversion, and the like may be used. In addition, instead of a porous membrane, a woven fabric or a non-woven fabric constituted by fibers of these resins may be used. Furthermore, a fibrous material such as cellulose may be used.

A thickness of the positive electrode 6 and the negative electrode 4 is not particularly limited. For example, a thickness of the positive electrode collector 6a or the negative electrode collector 4a may be set to around 6 to 25 μm. A thickness of the positive electrode active material layer 6b or the negative electrode active material layer 4b may be set to around 20 to 200 μm. A thickness of the separators 8 and 9 may be set to around 10 to 100 μm.

A length of the belt-like positive electrode 6 and negative electrode 4 in the winding direction is not particularly limited and can be set according to the number of winding turns or capacity. For example, a total length prior to winding can be set to 50 to 150 mm. A length of a portion that becomes a central core when the laminated body is wound can be set to, for example, around 10 to 15 mm. Lengths of the positive electrode 6, the negative electrode 4, and the separators 8 and 9 in a short-side direction (widths) are also not particularly limited, and can be set to, for example, around 11 to 18 mm. The number of winding turns is also not particularly limited and can be set to 4 to 8 turns or, more specifically, to 6 turns.

An electrolytic solution L is sealed in the outer package 5. While the electrolytic solution mainly impregnates the wound body 100 of the laminated body 10, a void between the wound body 100 and the outer package 5 is also filled with the electrolytic solution. Normally, the outer package 5 is sealed or the like in a vacuum during production in order to prevent gas from entering the outer package 5.

The electrolytic solution is not particularly limited and, for example, an electrolytic solution (an aqueous electrolytic solution or an electrolytic solution using an organic solvent) including a lithium salt can be used in the present embodiment. However, since an aqueous electrolytic solution has a low electrochemical decomposition voltage which limits tolerable voltage during charging to a low level, an electrolytic solution that uses an organic solvent (a nonaqueous electrolytic solution) is favorable. As the electrolytic solution, an electrolytic solution in which a lithium salt is dissolved in a nonaqueous solvent (an organic solvent) is favorably used. Examples of lithium salts that can be used include salts of $LiPF_6$, $LiClO_4$, $LiBF_4$, $LiAsF_6$, $LiCF_3SO_3$, $LiCF_3$, $CF_2SO_3$, $LiC(CF_3SO_2)_3$, $LiN(CF_3SO_2)_2$, $LiN(CF_3CF_2SO_2)_2$, LiN ($CF_3SO_2$)($C_4F_9SO_2$), $LiN(CF_3CF_2CO)_2$, LiBOB, and the like. Moreover, one type of salt among the above may be used independently or two or more types of salt may be used in combination.

In addition, favorable examples of the organic solvent include propylene carbonate, ethylene carbonate, diethyl carbonate, dimethyl carbonate, methyl ethyl carbonate, and the like. These may be used independently or two or more types can be used mixed at an arbitrary mixture fraction.

Moreover, in the present embodiment, in addition to a liquid electrolytic solution, the electrolytic solution may alternatively be a gelatinous electrolyte that is obtained by adding a gelling agent.

In the wound body 100, while the 4-layer laminated body 10 described above is wound in a flattened spiral as shown in FIG. 1, a structure near a winding center p is not particularly limited as long as the positive electrode 6 and the negative electrode 4 are not short-circuited.

In particular, in the present embodiment, all of (a) to (c) below are satisfied at the outer end 10e in the winding direction of the laminated body 10 that constitutes the wound body 100 as shown in FIG. 2:

(a) the first separator 8 and the second separator 9 protrude more outward in the winding direction (leftward in FIG. 2) than the negative electrode (the second electrode) 4;

(b) the positive electrode (the first electrode) 6 protrudes more outward in the winding direction than the first separator 8 and the second separator 9; and (c) an outer end 8e of the first separator 8 in the winding direction inclines toward the center of winding p beyond the negative electrode (the second electrode) 4 and comes into contact with an upper surface of the second separator 9, and an outer end 6e of the positive electrode (the first electrode) 6 in the winding direction inclines toward the center of winding p beyond the negative (the second electrode) 4 and comes into contact with the second separator 9 and with a peripherally inner positive electrode (first electrode) 6i.

In this case, "outward in the winding direction" refers to a direction which is along the spiral of the wound laminated body 10 and which separates from the outer end 10e of the laminated body 10. The outer end 6e of the positive electrode 6 is favorably bent along the outer end 8e of the first separator 8.

While respective protrusion lengths at the outer end 10e of the laminated body 10 in the winding direction are not particularly limited, for example, with respect to the negative electrode (the second electrode) 4, the first separator 8 can be caused to protrude approximately 2 to 4 mm, the second separator 9 can be caused to protrude approximately 4 to 8 mm, and the positive electrode (the first electrode) 6 can be caused to protrude approximately 5 to 10 mm. For example, the protrusion lengths may be measured along a surface of the peripherally inner positive electrode 6i.

The wound structure is fixed by fixing the outer end 6e of the positive electrode 6 that extends outward from the laminated body 10 in the winding direction to an outer peripheral surface of the wound body 100 by an adhesive tape 33 so as to press the outer end 6e of the positive electrode 6 peripherally inward with respect to the wound body 100. The adhesive tape 33 has a thickness of around 30 μm.

According to the present embodiment, a void created between the outer end 6e of the peripherally outermost positive electrode (first electrode) 6 and the peripherally inner positive electrode (first electrode) 6i is favorably blocked by the first separator 8 and the second separator 9. Consequently, even if a gas is generated inside the electrochemical device during use, since the size of bubbles formed inside the outer end 10e of the wound body 100 can be reduced, separation of the adhesive tape 33, formation of a void or a displacement between the positive electrode 6 and the negative electrode 4 and between the separators 8 and 9, and the like due to uplifting of the positive electrode 6 and the like can be suppressed. As a result, deterioration in capacity and impedance over use can be suppressed.

In order to make such an electrochemical device, a length of each of the four layers of the laminated body 10 need only be determined in advance so that a position of the outer end 10e at a winding end satisfies conditions such as described above. Alternatively, protrusion lengths may be regulated by cutting a length of an end of each layer after winding.

Second Embodiment

Next, an example of an electrochemical device according to a second embodiment of the first invention will now be described with reference to FIG. 3. Since the electrochemical device according to the present embodiment only differs from the first embodiment in a structure of the outer end 10e of the laminated body 10 in the winding direction, only the outer end 10e of the laminated body 10 in the winding direction will be described.

In the present embodiment, the outer end 8e of the first separator 8 in the winding direction inclines toward the center of winding p beyond the negative electrode (the second electrode) 4, a lower surface of the outer end 8e of the first separator 8 in the winding direction comes into contact with the second separator 9, a tip of the outer end 8e of the first separator 8 in the winding direction comes into contact with the peripherally inner positive electrode 6i, and an outer end 6e of the positive electrode (the first electrode) 6 in the winding direction inclines toward the center of winding p beyond the negative (the second electrode) 4 and comes into contact with the peripherally inner positive electrode 6i. The outer end 6e of the positive electrode 6 is favorably bent along the outer end Se of the first separator 8.

Even in this case, the formation of a void created between the outer end 6e of the peripherally outermost positive electrode (first electrode) 6 and the inner periphery positive electrode (first electrode) 6i can be suppressed in comparison with conventional devices.

Heretofore, while a preferable embodiment of the first invention has been described in detail, the present invention is not limited to the above embodiment.

For example, while a case in which the wound-type electrochemical device is a lithium-ion secondary battery has been described in the above embodiment, the wound-type electrochemical device according to the present invention is not limited to a lithium-ion secondary battery and may alternatively be a secondary battery other than a lithium-ion secondary battery such as a metallic lithium secondary battery, a lithium capacitor, an electric double layer capacitor, an electrolytic capacitor, or the like. Moreover, in cases of electrochemical devices other than a lithium-ion secondary battery, an electrode active material suitable for each electrochemical device may be used.

For example, in the case of an electric double layer capacitor, acetylene black, graphite, black lead, activated carbon, or the like is used as an active material included in a cathode active material-containing layer and an anode active material-containing layer. In addition, as the electrolytic solution, for example, an electrolytic solution obtained by dissolving a quaternary ammonium salt such as tetraethylammonium tetrafluoroborate (TEA-BF4) in an organic solvent such as propylene carbonate (PC), diethylene carbonate (DEC), or acetonitrile is used.

Furthermore, for example, in the case of an electrolytic capacitor, an aluminum foil having an anodic oxide film and an aluminum foil not having an anodic oxide film may be used as the electrodes and a known electrolytic solution may be used as the electrolytic solution.

Since gas is also generated by the electrolytic solution or the like over use in such wound-type electrochemical devices other than a lithium-ion secondary battery, a similar effect can be achieved.

In addition, with the method for manufacturing an electrochemical device described above, the operational advantages of the present invention can be achieved even when the positive electrode 6 and the negative electrode 4 are interchanged.

Furthermore, while a flat wound-type electrochemical device is described above, an implementation is also possible using a circular or elliptical wound-type electrochemical device.

Example A

Example A1

EDLC

An electric double layer capacitor (EDLC) according to the first embodiment (FIG. 2) of the first invention was made. An aluminum foil with a thickness of 20 µm was used as collectors, an activated carbon-containing layer with a thickness of 18 µm was used as active material layers, a cellulose sheet with a thickness of 30 µm was used as separators, and TEA-BF4-PC was used as an electrolytic solution. At the outer end 10e in the winding direction, with respect to the negative electrode (the second electrode) 4, the first separator 8 was caused to protrude by approximately 3 mm, the second separator 9 was caused to protrude by approximately 6 mm, and the positive electrode (the first electrode) 6 was caused to protrude by approximately 9 mm. A width of the electrodes was set to 12.5 mm and the number of winding turns to 6 turns.

Example A2

EDLC

With the exception of a structure of the outer end in the winding direction being replaced by a structure according to the second embodiment (FIG. 3), example A2 was configured similar to example A1. Specifically, at the outer end in the winding direction, with respect to the negative electrode (the second electrode) 4, the first separator 8 was caused to protrude by approximately 6 mm, the second separator 9 was caused to protrude by approximately 3 mm, and the positive electrode (the first electrode) 6 was caused to protrude by approximately 9 mm.

Example A3

LIB

A lithium-ion secondary battery (LIB) according to the first embodiment was made in a similar manner to example A1 with the exception of the positive electrode 6 being constituted by a 100 µm-lithium manganese layer as an active material layer provided on a collector with a thickness of 20 µm, and a PC solution of $LiPF_6$ being used as the electrolytic solution.

Example A4

LIB

A lithium-ion secondary battery according to the second embodiment was made in a similar manner to example A2 with the exception of the positive electrode 6 being constituted by a 100 µm-lithium manganese layer as an active material layer provided on a collector with a thickness of 20 µm, and a PC solution of $LiPF_6$ being used as the electrolytic solution.

Comparative Example A1

EDLC

Figure 4:
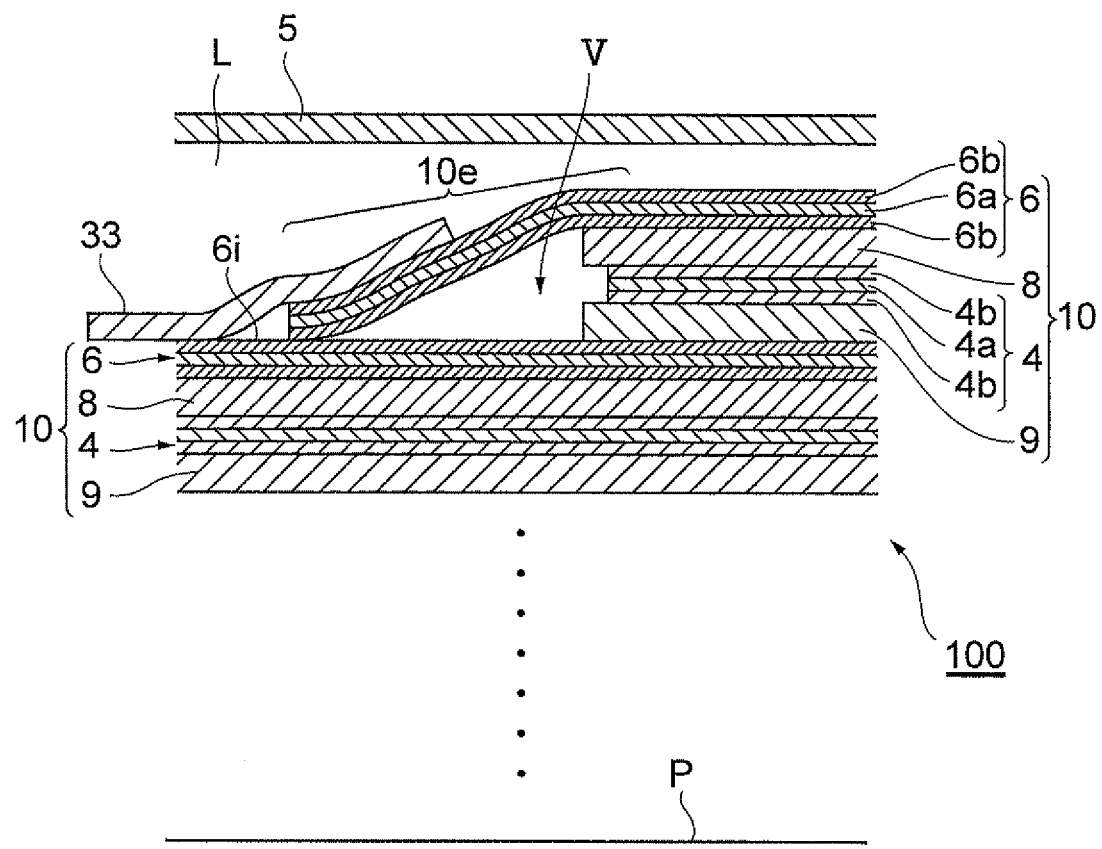
FIG. 4 is a cross-sectional view of an outer end of an electrochemical device in a winding direction according to a reference embodiment of the first invention.

With the exception of a structure of the outer end in the winding direction being replaced by a structure shown in FIG. 4, comparative example A1 was configured similar to example A1. Specifically, at the outer end in the winding direction, with respect to the negative electrode (the second electrode) 4, the first separator 8 was caused to protrude by approximately 3 mm, the second separator 9 was caused to protrude by approximately 3 mm, and the positive electrode (the first electrode) 6 was caused to protrude by approximately 9 mm.

Comparative Example A2

LIB

With the exception of a structure of the outer end in the winding direction being replaced by the structure shown in FIG. 4, comparative example A2 was configured similar to example A3. Specifically, at the outer end in the winding direction, with respect to the negative electrode (the second electrode) 4, the first separator 8 was caused to protrude by approximately 3 mm, the second separator 9 was caused to protrude by approximately 3 mm, and the positive electrode (the first electrode) 6 was caused to protrude by approximately 9 mm.

(Evaluation)

With the EDLCs, a capacity retention rate and a rate of impedance rise were measured after performing 20,000 repetitions of a constant voltage/constant current charge at 500 mA up to 2.5 V and a constant voltage/constant current discharge at 500 mA down to 1.5 V.

With the LIBs, a capacity retention rate and a rate of impedance rise were measured after performing 500 repetitions of a constant voltage/constant current charge at 500 mA up to 4.2 V and a constant voltage/constant current discharge at 500 mA down to 3.2 V. Results thereof are as shown in Table 1.

TABLE 1

Figure 3:
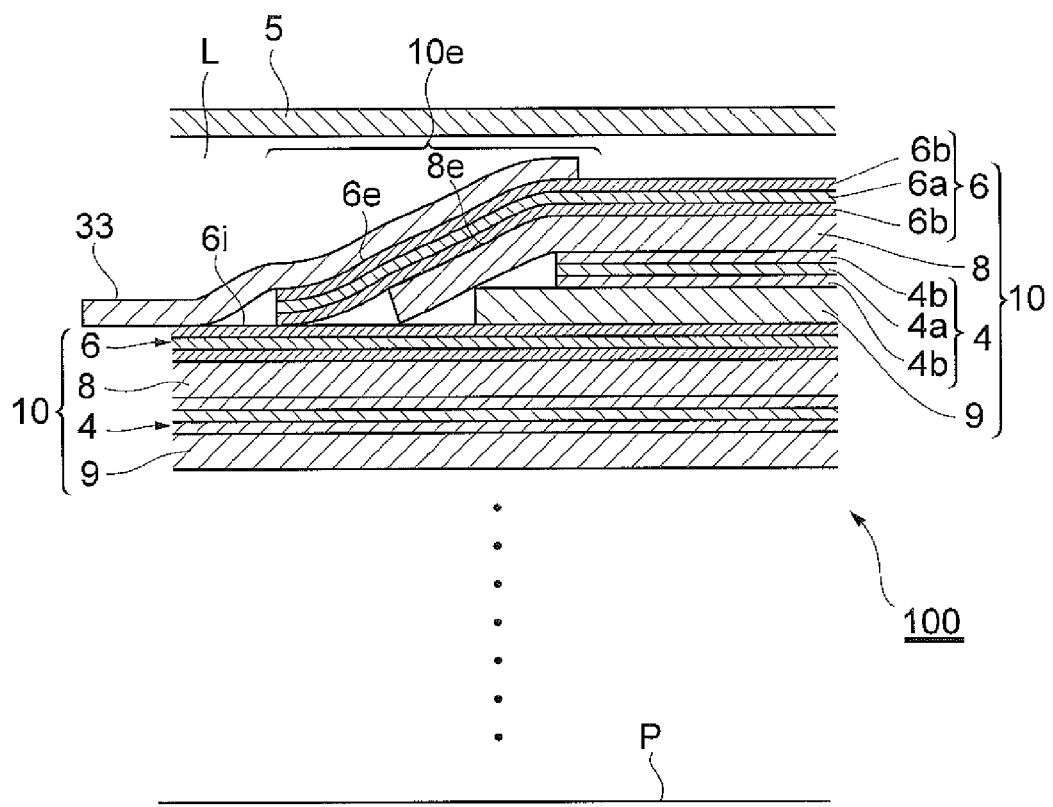
FIG. 3 is a cross-sectional view of an outer end of an electrochemical device in a winding direction according to a second embodiment of the first invention.

|  | Type | End configuration | Capacity retention rate (%) | Rate of impedance rise (%) |
| --- | --- | --- | --- | --- |
| Example A1 | EDLC | FIG. 2 | 97 | 3 |
| Example A2 | EDLC | FIG. 3 | 93 | 5 |
| Example A3 | LIB | FIG. 2 | 90 | 26 |
| Example A4 | LIB | FIG. 3 | 87 | 30 |

TABLE 1-continued

| | Type | End configuration | Capacity retention rate (%) | Rate of impedance rise (%) |
|---|---|---|---|---|
| Comparative example A1 | EDLC | FIG. 4 | 76 | 32 |
| Comparative example A2 | LIB | FIG. 4 | 78 | 51 |

Second Invention (Wound-Type Lithium-Ion Secondary Battery)

Figure 5:
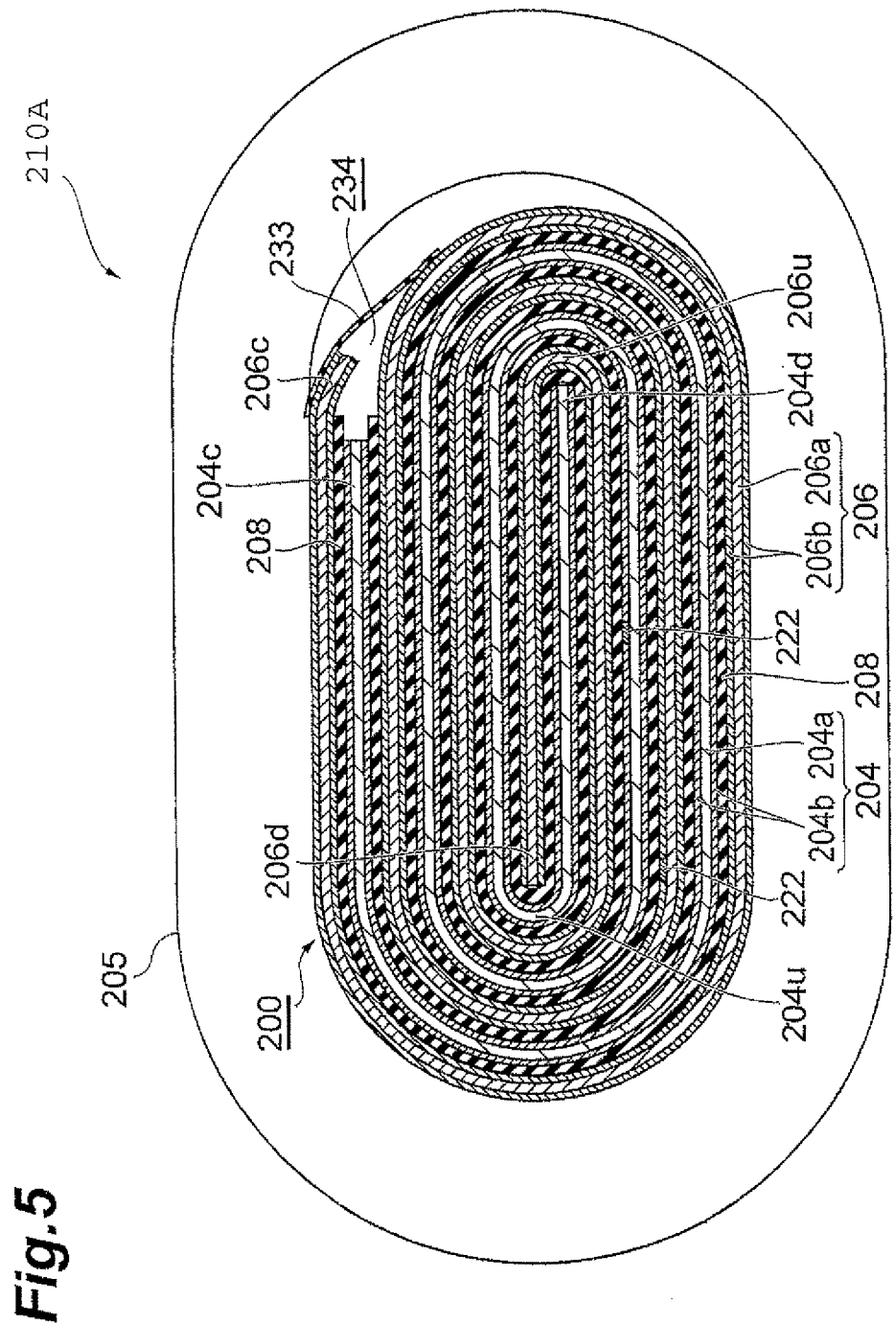
FIG. 5 is a cross-sectional view of a lithium-ion secondary battery that is an example of an electrochemical device manufactured in an embodiment of the second invention.

Next, a wound-type lithium-ion secondary battery as an example of a wound-type electrochemical device made according to an embodiment of the second invention will be described with reference to FIG. 5. As shown in FIG. 5, a wound-type lithium-ion secondary battery 210 comprises an approximately elliptical wound body 200 in which a belt-like positive electrode 204 and a belt-like negative electrode 206 are wound so as to sandwich a belt-like separator 208, and a container 205 that houses the wound body 200. Leads 222 are respectively connected to the positive electrode 204 and the negative electrode 206 of the wound body 200 and, although not shown, protrude outside of the container 205.

The positive electrode 204 has a belt-like positive electrode collector 204a and a positive electrode active material layer 204b that covers both surfaces of the positive electrode collector 204a. The negative electrode 206 has a belt-like negative electrode collector 206a and a negative electrode active material layer 206b that covers both surfaces of the negative electrode collector 206a.

As far as a coverage by the positive electrode active material layer 204b of both surfaces of the positive electrode collector 204a and a coverage by the negative electrode active material layer 206b of both surfaces of the negative electrode collector 206a are concerned, the higher the more favorable. The higher the respective coverages, the greater the capacity of the lithium-ion secondary battery 2101. In the present embodiment, with the exception of the positive electrode 204, the negative electrode 206, and portions where the leads 222 respectively connected thereto are installed, both surfaces of the positive electrode collector 204a are entirely covered by the positive electrode active material layer 204b and both surfaces of the negative electrode collector 206a are entirely covered by the negative electrode active material layer 206b.

In the wound body 200, both surfaces of one layer of the positive electrode 204 are respectively adjacent to the negative electrode 206 via the separator 208, and with the exception of an peripherally outermost portion, both surfaces of one layer of the negative electrode 206 are respectively adjacent to the positive electrode 204 via the separator. In particular, a center-side end 206d of the negative electrode 206 is sandwiched by a U-shaped portion 204u formed by the positive electrode 204 positioned on the center side of the wound body 200, a center-side end 204d of the positive electrode 204 is sandwiched by a U-shaped portion 206u formed by the negative electrode 206 positioned on the center side of the wound body 200, and the positive electrode 204 and the negative electrode 206 are arranged at symmetrical positions on the center side. In other words, both surfaces of the center-side end 204d of the one layer of the positive electrode 204 are respectively adjacent to the negative electrode 206 via the separator 208, and both surfaces of the center-side end 206d of the one layer of the negative electrode 206 are respectively adjacent to the positive electrode 204 via the separator.

In the present embodiment, on the center side of the wound body 200, both surfaces of the positive electrode 204 respectively oppose the negative electrode 206 and both surfaces of the negative electrode 206 respectively oppose the positive electrode 204, and a portion in which the positive electrode 204 and the negative electrode 206 do not oppose each other is not formed on the center side of the wound body 200. In addition, with the exception of positions at which the leads are connected, a portion in which any of the opposing positive and negative electrodes is not provided with an active material is not formed. Therefore, the present embodiment is capable of improving a capacity of the lithium-ion secondary battery 21 OA compared to conventional batteries.

Among the outer end 204c of the positive electrode 204 and the outer end 206e of the negative electrode 206 arranged on an outer peripheral side of the wound body 200, the outer end 206e of the negative electrode 206 arranged peripherally outermost extends further in a winding direction of the wound body 200 (a longitudinal direction of the negative electrode 206) than the outer end 204c of the positive electrode 204 arranged peripherally inward. As a result, a void 234 is created between the outer end 206c of the negative electrode 206 that extends in the winding direction of the wound body 200 and an outer periphery of the wound body 200. In addition, the outer end 206c of the negative electrode 206 that extends in the winding direction of the wound body 200 is fixed to an outer peripheral surface of the wound body 200 by an adhesive tape 233 so as to be pressed toward an inner peripheral side of the wound body 200.

By fixing the outer end 206c of the negative electrode 206 that extends in the winding direction of the wound body 200 to the outer peripheral surface of the wound body 200 by an adhesive tape 233 so as to press the outer end 206c of the negative electrode 206 toward the inner peripheral side of the wound body 200, the outer end 206c of the negative electrode 206 and the adhesive tape 233 are partially pushed into the void 234. As a result, a difference in levels of the respective outer ends 204c and 206c of the positive electrode 204 and the negative electrode 206 on the outer peripheral surface of the wound body 200 is reduced to create an approximately flat outer periphery of the wound body 200, and the wound body 200 can be housed in the container 205 more easily.

A collector that is used in known electrochemical devices can be used as the positive electrode collector 204a and the negative electrode collector 206a. For example, a collector molded in a belt shape from copper, aluminum, nickel, or the like can be used.

The positive electrode active material layer 204b is a layer that includes a positive electrode active material (a cathode active material), a conductive additive, a binder, and the like. The cathode active material is not particularly limited as long as the cathode active material is capable of reversibly promoting storage and release of lithium ions, extraction and insertion (intercalation) of lithium ions, or doping and dedoping of lithium ions and counter-anions thereof (for example, $PF_6$), and known electrode active materials can be used. For example, complex metallic oxides including lithium cobalt oxide ($LiCoO_2$), lithium nickel oxide ($LiNiO_2$), lithium manganese spinel ($LiMn_2O_4$), a complex metallic oxide described by the general formula $LiNi_xCo_yMn_zM_aO_2$ (where $x+y+z+a=1$, $0 \leq x \leq 1$, $0 \leq y \leq 1$, $0 \leq z \leq 1$, $0 \leq a \leq 1$, and M represents one or more elements selected from the group consisting of Al, Mg, Nb, Ti, Cu, Zn, and Cr), lithium vanadium compound ($LiV_2O_5$), olivine-like $LiMPO_4$ (where M represents one or more elements selected from the group consisting of Co, Ni, Mn or the group consisting of Fe, Mg, Nb, Ti, Al, and Zr, or VO), and lithium titanium oxide ($Li_4Ti_5O_{12}$) can be used.

Examples of materials that can be used as the binder include fluororesins such as polyvinylidene fluoride (PVDF), polytetrafluoroethylene (PTFE), a tetrafluoroethylene-hexafluoropropylene copolymer (FEP), a tetrafluoroethylene-perfluoroalkyl vinyl ether copolymer (PFA), an ethylene-tetrafluoroethylene copolymer (ETFE), polychlorotrifluoroethylene (PCTFE), an ethylene-chlorotrifluoroethylene copolymer (ECTFE), and polyvinyl fluoride (PVF).

In addition, besides the above materials, for example, a vinylidene fluoride-based fluororubber such as vinylidene fluoride-hexafluoropropylene-based fluororubber (VDF-HFP-based fluororubber), vinylidene fluoride-hexafluoropropylene-tetrafluoroethylene-based fluororubber (VDF-HFP-TFE-based fluororubber), vinylidene fluoride-pentafluoropropylene-based fluororubber (VDF-PFP-based fluororubber), vinylidene fluoride-pentafluoropropylene-tetrafluoroethylene-based fluororubber (VDF-PFP-TFE-based fluororubber), vinylidene fluoride-perfluoromethyl vinyl ether-tetrafluoroethylene-based fluororubber (VDF-PFMVE-TFE-based fluororubber), and vinylidene fluoride-chlorotrifluoroethylene-based fluororubber (VDF-CTFE-based fluororubber) may be used as the binder.

Furthermore, besides the above materials, for example, polyethylene, polypropylene, polyethylene-telephthalate, aromatic polyamide, cellulose, styrene butadiene rubber, isoprene rubber, butadiene rubber, ethylene propylene rubber, or the like may be used as the binder. In addition, a thermoplastic elastomeric polymer such as a styrene-butadiene-styrene block copolymer, a hydrogen additive thereof, a styrene-ethylene-butadiene-styrene copolymer, a styrene-isoprene-styrene block copolymer, and a hydrogen additive thereof may be used. Furthermore, syndiotactic 1,2-polybutadiene, an ethylene-vinyl acetate copolymer, a propylene $\alpha$-olefin (carbon number 2 to 12) copolymer, or the like may be used.

Moreover, an electron-conductive conducting polymer or an ionically-conductive conducting polymer may be used as the binder. Examples of an electron-conductive conducting polymer includes polyacetylene. In this case, since the binder also functions as conductive additive particles, a conductive additive need not be added.

As an ionically-conductive conducting polymer, for example, those having ion conductivity of a lithium-ion or the like can be used, such as a complex of a monomer of a macromolecular compound (a polyether-based macromolecular compound such as polyethylene oxide and polypropylene oxide, a crosslinked polymer of a polyether compound, polyepichlorohydrin, polyphosphazene, polysiloxane, polyvinylpyrrolidone, polyvinylidene carbonate, polyacrylonitrile, and the like), and a lithium salt or an alkali metal salt based on lithium such as $LiClO_4$, $LiBF_4$, $LiPF_6$, $LiAsF_6$, LiCl, LiBr, $Li(CF_3SO_2)_2N$, and $LiN(C_2F_5SO_2)_2$. Examples of a polymerization initiator that can be used for complexification include a photopolymerization initiator or a thermal polymerization initiator suitable for the monomers described above.

A content of the binder favorably ranges from 0.5 to 6 percent by mass in reference to a mass of the active material layer. When the content of the binder drops below 0.5 percent by mass, a tendency of an insufficient amount of the binder preventing a strong active material layer from being formed increases. On the other hand, when the content of the binder exceeds 6 percent by mass, a tendency of an increase in an amount of the binder not contributing to capacitance preventing a sufficient energy density from being obtained increases. Furthermore, in this case, particularly, when an electron conductivity of the binder is low, a tendency of an increase in an electrical resistance of the active material layer preventing a sufficient capacitance from being obtained increases.

Examples of a conductive additive include carbon blacks, carbon material, fine metallic particles of copper, nickel, stainless steel, iron, or the like, a mixture of a carbon material and fine metallic particles, and a conductive oxide such as ITO. A content of the conductive additive favorably ranges from 0.5 to 6 percent by mass in reference to the mass of the active material layer.

The negative electrode active material layer 206b is a layer that includes a negative electrode active material (an anode active material), a conductive additive, a binder, and the like. The anode active material is not particularly limited as long as the anode active material is capable of reversibly promoting storage and release of lithium ions, extraction and insertion (intercalation) of lithium ions, or doping and dedoping of lithium ions and counter-anions thereof (for example, $PF_6$), and known anode active materials can be used. Examples of such active materials include carbon materials such as natural graphite, artificial graphite, non-graphitizable carbon, graphitizable carbon, and low-temperature sintered carbon, a metal capable of combining with lithium such as Al, Si, Sn, and Si, an oxide-based amorphous compound such as SiO, $SiO_x$, $SiO_2$, and $SnO_2$, lithium titanium oxide ($Li_4Ti_5O_{12}$), and $TiO_2$. Among the above, a carbon material is favorable, and a carbon material with an interlayer distance $d_{002}$ ranging from 0.335 to 0.338 nm and a crystallite size $Lc_{002}$ ranging from 30 to 120 nm is more favorable. Carbon materials satisfying such a condition include artificial graphite, MCF (meso-carbon fiber), and MCMB (meso-carbon microbeads). The interlayer distance $d_{002}$ and the crystallite size $Lc_{002}$ described above can be obtained by X-ray diffractometry.

The binder and the conductive additive are similar to that of the positive electrode.

As the separator 208, for example, a separator formed of an electrically insulating porous material can be used. Examples of electrically insulating materials include resin materials such as polyethylene, polypropylene, and other polyolefins, and polyester, polyacrylonitrile (PAN), and other heat resistant resins. These may be single layer bodies or laminated bodies constituted by various resins. A method of manufacturing a porous membrane of resin is also not particularly limited, and stretching, phase inversion, and the like may be used. In addition, instead of a porous membrane, a woven fabric or a non-woven fabric constituted by fibers of these resins may be used. Furthermore, a fibrous material such as cellulose may be used.

A thickness of the positive electrode collector 204a or the negative electrode collector 206a is set to around 6 to 25 µm. A thickness of the positive electrode active material layer 204b or the negative electrode active material layer 206b is set to around 20 to 200 µm. A thickness of the separator 208 is set to around 10 to 100 µm. The adhesive tape 233 has a thickness of, for example, around 30 µm.

A length of the wound body 200 in a longitudinal direction (a left-right direction in FIG. 5) is not particularly limited and can be set according to the number of winding turns or capacity. For example, the length can be set to around 10 to 15 mm. A length of the wound body 200 in a width direction (a depth direction in FIG. 5) is also not particularly limited and, for example, can be set to around 11 to 17 mm.

The wound body 200 configured as described above contains various known electrolytic solution.

(Method for Manufacturing Wound-Type Electrochemical Device)

Next, a method for manufacturing the aforementioned lithium-ion secondary battery 210A will be described with reference to FIGS. 6(a) to 6(c) and FIGS. 7(a) to 7(c). In the present embodiment, an electrode winding apparatus 250 shown in FIG. 6(a) which has a core 210 is used. The electrode winding apparatus 250 primarily comprises a table 241, a support plate 242, a rotating shaft 243, a plate fixing portion 240, and plates 212 and 214.

The table 241 is arranged approximately horizontally (in an XY direction in FIG. 6(a)), and the support plate 242 is fixed approximately perpendicular to the table 241 on a surface of the table 241. The rotating shaft 243 is arranged so as to penetrate the support plate 242, and is supported by shaft bearings 244a and 244b arranged on both sides of the support plate 242 against the support plate 242 so as to be rotatable around an axis a that is oriented along a Y direction.

One end of a bracket 245a is fixed to one end side (a right hand-side in FIG. 6(a)) of the rotating shaft 243 so that the bracket 245a is perpendicular to the rotating shaft 243, and a handle 245b is fixed to another end of the bracket 245a.

A pedestal 246 is fixed to another end side (a left hand-side in FIG. 6(a)) of the rotating shaft 243. Specifically, the pedestal 246 has a hole 246a that accepts the other end of the rotating shaft 243. A notch 243a that forms a planar portion is provided on an end of the other end side of the rotating shaft 243. Due to a tip of a bolt 244 screwed into the pedestal 246 abutting the notch 243a of the rotating shaft, the pedestal 246 is fixed to the rotating shaft 243, and a rotation of the handle 245b causes the pedestal 246 to also rotate around the axis a of the rotating shaft 243.

The pedestal 246 has a surface 246b that is parallel to the axis a of the rotating shaft 243. A pair of plates 212 and 214 is arranged on the surface 246b of the pedestal 246 so that the plates 212 and 214 oppose and overlap each other. The plate 212 and the plate 214 both have an approximately rectangular shape with the direction of the axis a as a longitudinal direction thereof. One of ends of the plate 212 in the longitudinal direction and one of ends of the plate 214 in the longitudinal direction are respectively arranged on the surface 246b of the pedestal 246. Although a thickness of the plates 212 and 214 is not particularly limited, for example, the thickness can be set to 0.1 to 1 mm. In addition, for example, a length of the plates 212 and 214 in a Y-axis direction can be set to around 30 to 100 mm, and a width of the plates 212 and 214 in an X-axis direction can be set to around 5 to 30 mm. In particular, favorably, by setting the Y-direction length of one of the pair of plates 212 and 214 and the Y-direction length of the other plate so as to differ from each other or the like, one of the plates 212 and 214 protrudes further in the direction of the axis a than the other plate at ends of the plates 212 and 214 on an opposite side of the pedestal 246 (a −Y side). In FIG. 6(a), the end of the plate 212 is shown protruding.

The plates 212 and 214 are sandwiched by the plate fixing portion 240 so that the axis a of the rotating shaft 243 is arranged between the plates 212 and 214, and extend in the direction of the axis a of the rotating shaft 243. In this case, "between the plates 212 and 214" refers to a region including the respective thicknesses of the plates 212 and 214. The plate 212 and the plate 214 constitute the core 210.

While the plate 212 and the plate 214 may be arranged so that the plates 212 and 214 are staggered in the X direction when viewed from the Y direction as shown in FIG. 6(b), the plate 212 and the plate 214 may alternatively be arranged so that the plates 212 and 214 completely overlap each other as shown in FIG. 6(c). A width X225 in the X direction determines a width of the core 210. In the present embodiment, a state shown in FIG. 6(c) will be described below.

A pressing member 247 is arranged on the plate 212 and the plate 214 so as to oppose the surface 246b of the pedestal 246. The pressing member 247 is arranged so as to cover the ends of the plate 212 and the plate 214, and is fixed to the pedestal 246 by bolts 202 and 202 that are separated from each other in the X direction.

Next, a method for manufacturing an electrochemical device using such an electrode winding apparatus 250 will be described. First, as shown in FIG. 6(a) and FIG. 7(a), the belt-like separator 208 is prepared. Next, for example, the end of the plate 212 that protrudes more than the other plate is pressed by a finger or the like to form a void between the plate 212 and the plate 214, a central portion or the like of the separator 208 is inserted between the plate 212 and the plate 214 so that the separator 208 is sandwiched by and fixed between the plate 212 and the plate 214 and, subsequently, as shown in FIG. 7(a), a state is realized in which a side surface 212s of the plate (the one plate) 212 hooks the separator. At this point, the separator 208 opposes the side surface 212s of the plate 212. In this case, both ends of the separator 208 are favorably extended toward an opposite side (a+X side) to the side surface 212s of the one plate 212.

Next, as shown in FIG. 7(b), a state is realized in which the positive electrode 204 is arranged between the separator 208 hooked around the one plate 212 and in which a center-side end 204d of the positive electrode 204 is arranged between the one plate 212 and the separator 208 (completion of first step).

At this point, as shown in FIG. 7(b), while the center-side end 204d of the positive electrode 204 is favorably arranged at a portion p1 on a side farthest from the other plate 214 between the one plate 212 and the separator 208, an implementation is also possible in which the center-side end 204d of the positive electrode 204 is arranged at a portion p2 on a side closest to the other plate 214. Since a space between the separator 208 and the plate 212 can be easily expanded on the side of the portion p1, there is an advantage that the positive electrode 204 can be arranged on the side of the portion p1 with greater ease.

In addition, while the positive electrode 204 is favorably arranged after hooking the separator 208 around the plate 212 from the perspective of operability, an implementation is also possible in which the separator 208 is hooked around the plate 212 after arranging the positive electrode 204 above or below the plate 212. Alternatively, both implementations can be carried out at the same time.

Figure 6:
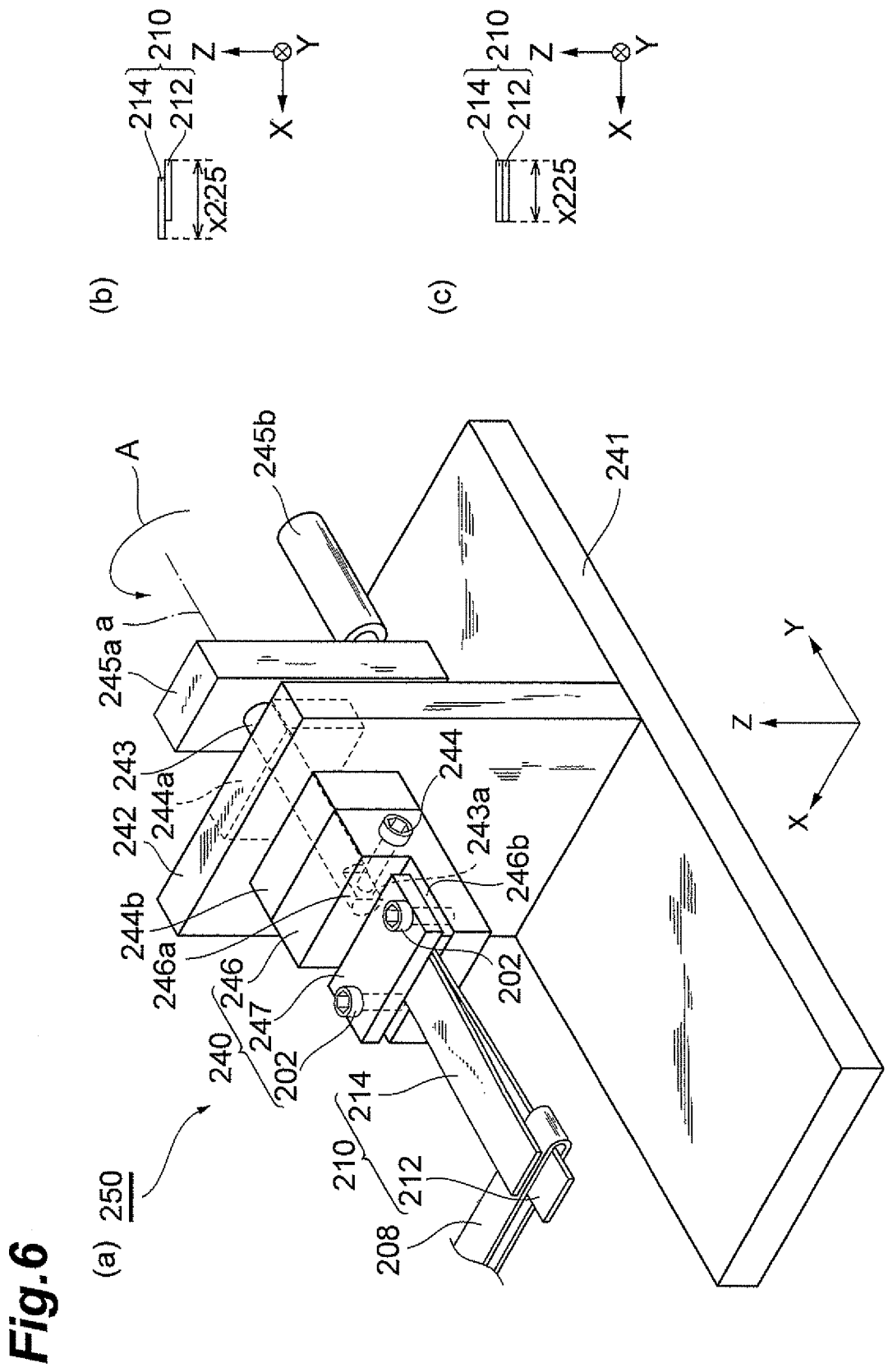
FIG. 6(a) is a schematic perspective view of an electrode winding apparatus 50 that is used in an embodiment of the second invention.
FIGS. 6(b) and 6(c) show various modes of plates 12 and 14 of the electrode winding apparatus 50 as viewed from a Y-direction.
Figure 7:
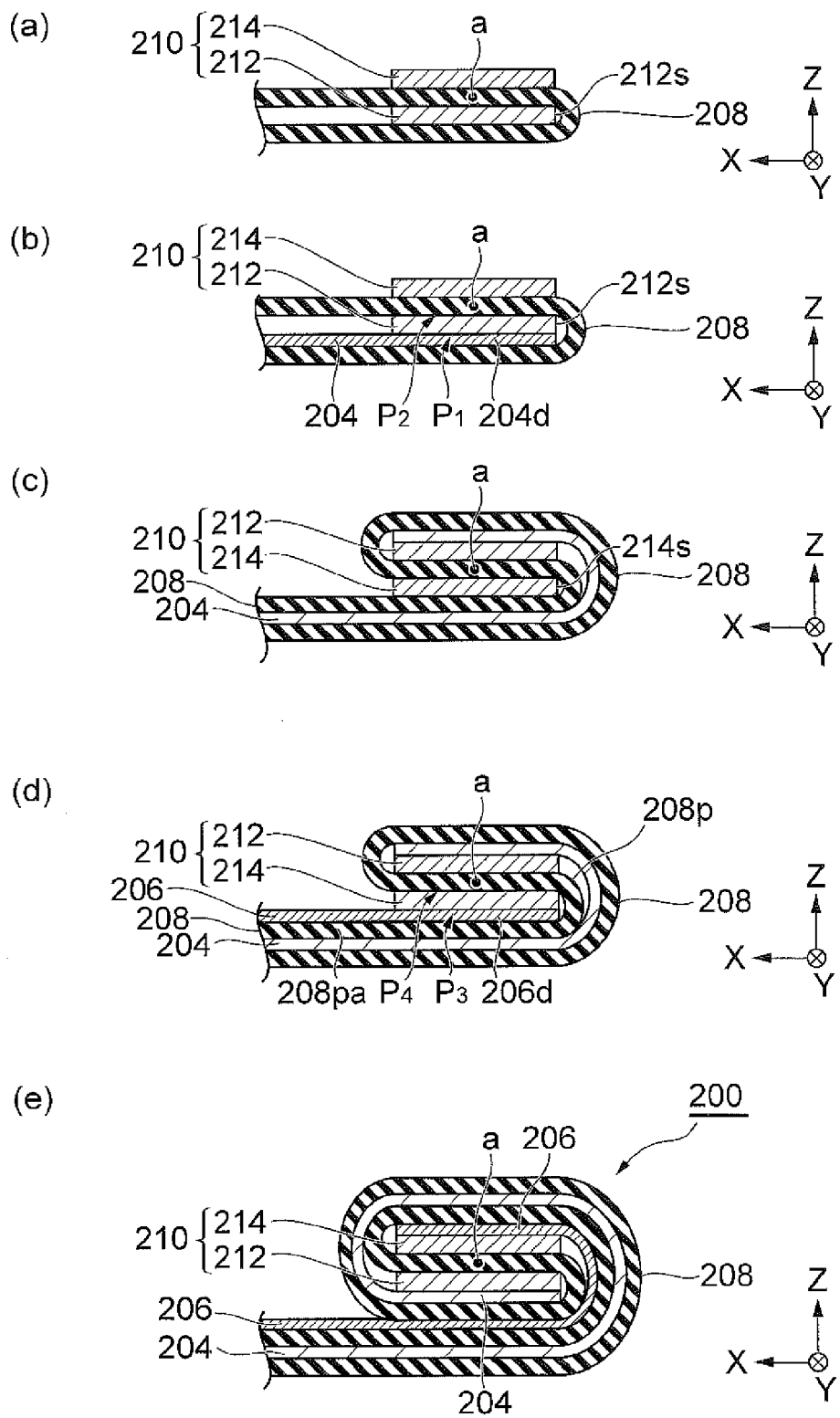
FIGS. 7(a) to 7(e) are schematic cross-sectional views that sequentially explain a method for manufacturing an electrochemical device according to an embodiment of the second invention.

Subsequently, the handle 245b shown in FIG. 6(a) is rotated in a direction A in FIG. 6, and by rotating the rotating shaft 203 around the axis a by approximately half a turn as shown in FIG. 7(c), the positive electrode 204 and the separator 208 that sandwiches the positive electrode 204 from both sides are hooked around the other plate 214. As a result, the side surface 214s of the other plate 214 opposes a laminated body constituted by the separator 208, the positive electrode 204, and the separator 208 (completion of second step). An angle of rotation is not particularly limited as long as the positive electrode 204 and the separator 208 that sandwiches the positive electrode 204 from both sides are hooked against the other plate.

Subsequently, as shown in FIG. 7(d), the negative electrode 206 is arranged along a portion 208pa of the separator 208 which extends in a direction away from the core 210 in a portion 208p of the separator 208 which is close to the other plate 214, and a center-side end 206d of the negative electrode 206 is arranged between the other plate 214 and the separator 208 (completion of third step).

At this point, while the center-side end 206d of the negative electrode 206 is favorably arranged at a portion p3 on a side farthest from the one plate 212 between the other plate 214 and the separator 208, an implementation is also possible in which the center-side end 206d of the negative electrode 206 is arranged at a portion p4 on a side closest to the one plate 212. Since a space between the separator 208 and the plate 212 can be easily expanded on the side of the portion p3, there is an advantage that the negative electrode 206 can be arranged on the side of the portion p3 with greater ease.

Next, by further winding the core 210 as shown in FIG. 7(e), a flat wound body 200 is completed in which the positive electrode 204, the negative electrode 206, and the separator 208 are wound around the core 112 formed by the plate 212 and the plate 214 (completion of fourth step). The number of turns is arbitrary. Subsequently, an electrochemical device is obtained by known methods including extracting the plates 212 and 214 that constitute the core 210 from the wound body 200, immersing the wound body 200 in an electrolytic solution, and sealing the wound body 200 in a container.

According to the present embodiment, an electrochemical device constructed as described above can be favorably manufactured. In particular, in the wound body 200 obtained according to FIG. 7(e), both of the pair of plates 212 and 214 of the core 210 have one of their surfaces opposing the positive electrode 204 or the negative electrode 206, and both surfaces of the plates 212 and 214 are never sandwiched by the separator 208. Accordingly, the plates 212 and 214 are less likely to become lodged in the wound body 200 and particularly in the separator 208 in the step of extracting the core 210 from the wound body 200. As a result, both operability and productivity are increased.

A possible reason therefor is as follows. Since the surface of the separator is not slippery, when the separator is in contact with both surfaces of the core, the separator becomes lodged with the core. On the other hand, since the surface of an electrode is slippery, the electrode is less likely to become lodged against the core even when in contact with the core. Therefore, even if one surface of the core is in contact with the separator, as long as the other surface of the core is in contact with the electrode, the surface in contact with the electrode conceivably provides enough slippage to weaken a force by which the separator is lodged against the core.

A wound-type electrochemical device manufactured as described above can be used as a power supply for a self propelled micromachine or an IC card, and in applications of dispersed power sources that are arranged on or in a printed circuit board.

Heretofore, while a preferable embodiment of the second invention has been described in detail, the second invention is not limited to the above embodiment.

For example, while a case in which the wound-type electrochemical device is a lithium-ion secondary battery has been described in the above embodiment, the wound-type electrochemical device according to the present invention is not limited to a lithium-ion secondary battery and may alternatively be a secondary battery other than a lithium-ion secondary battery such as a metallic lithium secondary battery, a lithium capacitor, an electric double layer capacitor, or the like. Moreover, in cases of electrochemical devices other than a lithium-ion secondary battery, an electrode active material suitable for each electrochemical device may be used. In addition, for example, in the case of an electric double layer capacitor, acetylene black, graphite, black lead, activated carbon, or the like is used as an active material included in a cathode active material-containing layer and an anode active material-containing layer. Furthermore, as the electrolytic solution, for example, an electrolytic solution obtained by dissolving a quaternary ammonium salt such as tetraethylammonium tetrafluoroborate in an organic solvent such as propylene carbonate, diethylene carbonate, or acetonitrile is used.

In addition, with the method for manufacturing an electrochemical device described above, the operational advantages of the present invention can be achieved even when the positive electrode 204 and the negative electrode 206 are interchanged.

Furthermore, the rotating shaft 243 of the electrode winding apparatus 250 need not necessarily be hand-operated and may alternatively be rotated using power produced by a motor or the like.

Moreover, while an axis of rotation a exists within a combined region of the plates 212 and 214 in the electrode winding apparatus 250, an implementation is also possible in which the axis of rotation a exists outside the combined region or, in other words, an implementation is also possible in which the axis of rotation a is eccentric.

Cross-sectional shapes of the plates 212 and 214 on an XZ plane are not particularly limited to a rectangle and a roundish shape such as a semiellipse may be adopted instead.

Furthermore, in the core 210, a void may exist between the plate 212 and the plate 214.

Example B

Example B1

Winding of a lithium-ion secondary battery was performed 100 times as shown in FIGS. 7(a) to 7(e). An aluminum foil was used as a positive electrode collector, a copper foil was used as a negative electrode collector, lithium manganese was used as a positive electrode active material, and graphite was used as a negative electrode active material. The plates of the core had a thickness of 0.5 mm and a size of 14×60 mm. A porous membrane made of PAN (polyacrylonitrile) was used as the separator.

Example B2

With the exception of a non-woven fabric made of cellulose being used as the separator, example B2 was configured similar to example B1.

Comparative Example B1

With the exception of performing winding as shown in FIGS. 8(a) to 8(d), comparative example B1 was configured similar to example B1.

The numbers of times the core 210 became lodged against the separator 208 when extracting the core 210 from the wound body were: 0 out of 100 in example B1; 5 out of 100 in example B2; and 98 out of 100 in comparative example B1.

REFERENCE SIGNS LIST 6 positive electrode (first electrode)
4 negative electrode (second electrode)
8 first separator
9 second separator
10 laminated body
100 wound body
110 lithium-ion secondary battery (electrochemical device)
a axis of rotation
204 positive electrode
206 negative electrode 208 separator
210 core
212 one plate
214 other plate
200 wound body
210A lithium-ion secondary battery (electrochemical device)

The invention claimed is:

1. An electrochemical device comprising:
    a wound body having a wound laminated body, the laminated body having a structure constituted by, starting from the outside, a first electrode, a first separator, a second electrode, and a second separator;
    an electrolytic solution; and
    an outer package that houses the wound body and the electrolytic solution, wherein
    the electrochemical device satisfies all of (a) to (c) below at an outer end of the laminated body in a winding direction:
    (a) the first separator and the second separator protrude more outward in the winding direction than the second electrode;
    (b) the first electrode protrudes more outward in the winding direction than the first separator and the second separator; and
    (c) (i) an outer end of the first separator in the winding direction inclines toward a center of winding beyond the second electrode and comes into contact with an outer surface of the second separator, and an outer end of the first electrode in the winding direction inclines toward the center of winding beyond the second electrode and comes into contact with the second separator, the outer end of the first electrode comprising an active material layer, and the active material layer at the outer end of the first electrode is in contact with an outer surface of a peripherally inner winding of the first electrode, or
    (ii) the outer end of the first separator in the winding direction inclines toward the center of winding beyond the second electrode and comes into contact with the second separator and with the outer surface of the peripherally inner winding of the first electrode, and the outer end of the first electrode in the winding direction inclines toward the center of winding beyond the second electrode, the outer end of the first electrode comprising an active material layer, and the active material layer at the outer end of the first electrode is in contact with the outer surface of the peripherally inner winding of the first electrode.

2. The electrochemical device according to claim 1, wherein in (c), the outer end of the first separator in the winding direction inclines toward the center of winding beyond the second electrode and comes into contact with the outer surface of the second separator, and the outer end of the first electrode in the winding direction inclines toward the center of winding beyond the second electrode and comes into contact with the second separator and with the outer surface of the peripherally inner winding of the first electrode.

3. An electrochemical device comprising:
    a wound body having a wound laminated body having an outer shape comprising two opposing planar sides and two opposing rounded sides, the laminated body having a structure constituted by, starting from the outside, a first electrode, a first separator, a second electrode, and a second separator;
    an electrolytic solution; and
    an outer package that houses the wound body and the electrolytic solution, wherein
    the electrochemical device satisfies all of (a) to (d) below at an outer end of the laminated body in a winding direction:
    (a) the first separator and the second separator protrude more outward in the winding direction than the second electrode;
    (b) the first electrode protrudes more outward in the winding direction than the first separator and the second separator;
    (c) (i) an outer end of the first separator in the winding direction inclines toward a center of winding beyond the second electrode and comes into contact with an outer surface of the second separator, and an outer end of the first electrode in the winding direction inclines toward the center of winding beyond the second electrode and comes into contact with the second separator, the outer end of the first electrode comprising an active material layer, and the active material layer at the outer end of the first electrode is in contact with an outer surface of a peripherally inner winding of the first electrode, or
    (ii) the outer end of the first separator in the winding direction inclines toward the center of winding beyond the second electrode and comes into contact with the second separator and with the outer surface of the peripherally inner winding of the first electrode, and the outer end of the first electrode in the winding direction inclines toward the center of winding beyond the second electrode, the outer end of the first electrode comprising an active material layer, and the active material layer at the outer end of the first electrode is in contact with the outer surface of the peripherally inner winding of the first electrode; and
    (d) each of the outer end of the first separator, an outer end of the second separator in the winding direction, the outer end of the first electrode, and an outer end of the second electrode in the winding direction are positioned along the same planar side of the wound laminated body.

* * * * *